Oct. 31, 1950     L. E. CUCKLER     2,528,342
RESISTANCE MEASURING APPARATUS
Filed April 26, 1947     4 Sheets-Sheet 1

INVENTOR.
LEE E. CUCKLER
BY *Arthur H. Swanson*
ATTORNEY

Oct. 31, 1950  L. E. CUCKLER  2,528,342
RESISTANCE MEASURING APPARATUS
Filed April 26, 1947  4 Sheets-Sheet 2

INVENTOR.
LEE E. CUCKLER
BY
ATTORNEY

Oct. 31, 1950   L. E. CUCKLER   2,528,342
RESISTANCE MEASURING APPARATUS
Filed April 26, 1947   4 Sheets-Sheet 3
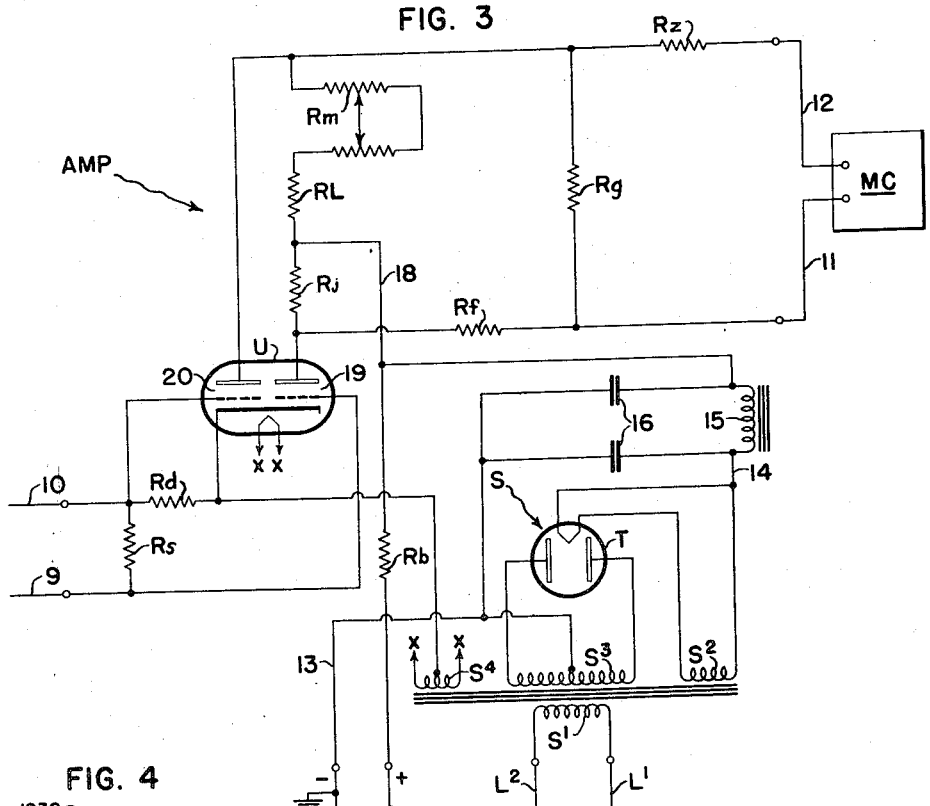
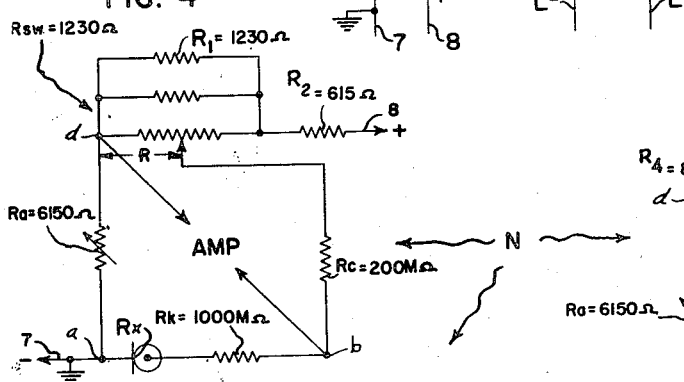
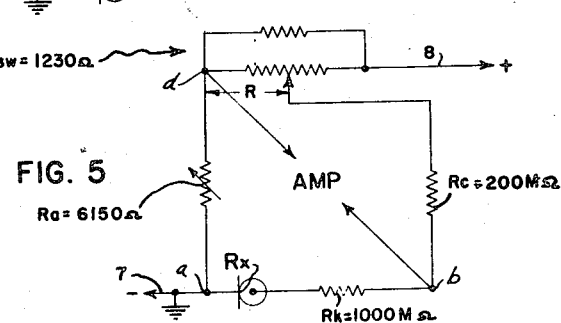
*INVENTOR.*
LEE E. CUCKLER
BY Arthur H. Swanson
ATTORNEY Oct. 31, 1950  L. E. CUCKLER  2,528,342
RESISTANCE MEASURING APPARATUS
Filed April 26, 1947  4 Sheets-Sheet 4

INVENTOR.
LEE E. CUCKLER
BY Arthur H. Swanson
ATTORNEY

Patented Oct. 31, 1950

2,528,342

UNITED STATES PATENT OFFICE 2,528,342

RESISTANCE MEASURING APPARATUS

Lee E. Cuckler, Philadelphia, Pa., assignor, by mesne assignments, to Minneapolis-Honeywell Regulator Company, Minneapolis, Minn., a corporation of Delaware Application April 26, 1947, Serial No. 744,231

4 Claims. (Cl. 175—183)

The general object of the present invention is to provide improved means for continuously measuring the electrical conductivity, or resistance, of bodies having high and widely varied resistances, such, for example, as the resistance of yarn having a relatively small moisture content and varying from a minimum not much greater than 2 megohms to a maximum which may be but little below 200,000 megohms.

More specifically, the object of the invention is to provide improved means for measuring resistances of the above mentioned character by means of a Wheatstone bridge circuit including means for so varying the magnitude of resistance elements included in said circuit that the unknown resistance may be accurately measured by the null method in one or another of definite measuring scale ranges accordingly as the magnitude of the unknown resistance is within one or another portion of a range of variation of the unknown resistance. While not restricted to such use, the invention was primarily designed for use and is of special utility in determining the moisture content of rayon warp yarn as the yarn passes away from a high speed slasher in which the yarn is coated with size and partially dried.

A specific object of the present invention is to provide resistance measuring apparatus of the above mentioned type which is characterized by the simple and effective manner in which resistance elements may be associated in various ways in the rebalancing arm of a Wheatstone bridge, dependent on the value of an unknown resistance included in another arm of the bridge, to the end that the resistance value of the unknown resistance may be measured in whichever of two or more predetermined scale ranges is best adapted for use in measuring such a resistance value. A still more specific object of the invention is to so relate the values of said resistance elements as to insure suitable measuring sensitivity and to avoid objectionable changes in the intensity of the bridge energizing current as the apparatus is adjusted for measurement in one or another range.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 3 is a diagrammatic showing of the amplifier and power supply section of the apparatus, shown in less detail in Fig. 2;

Fig. 4 is a diagram showing the resistances effectively included in the bridge circuit shown in Fig. 2 when adjusted for measurement in one scale range;

Fig. 5 is a diagram showing the resistances effectively included in the bridge circuit shown in Fig. 2 when adjusted for measurements in a second scale range;

Fig. 6 is a diagram showing the resistances effectively included in the bridge circuit shown in Fig. 2 when adjusted for measurements in a third scale range;

Figure 1:
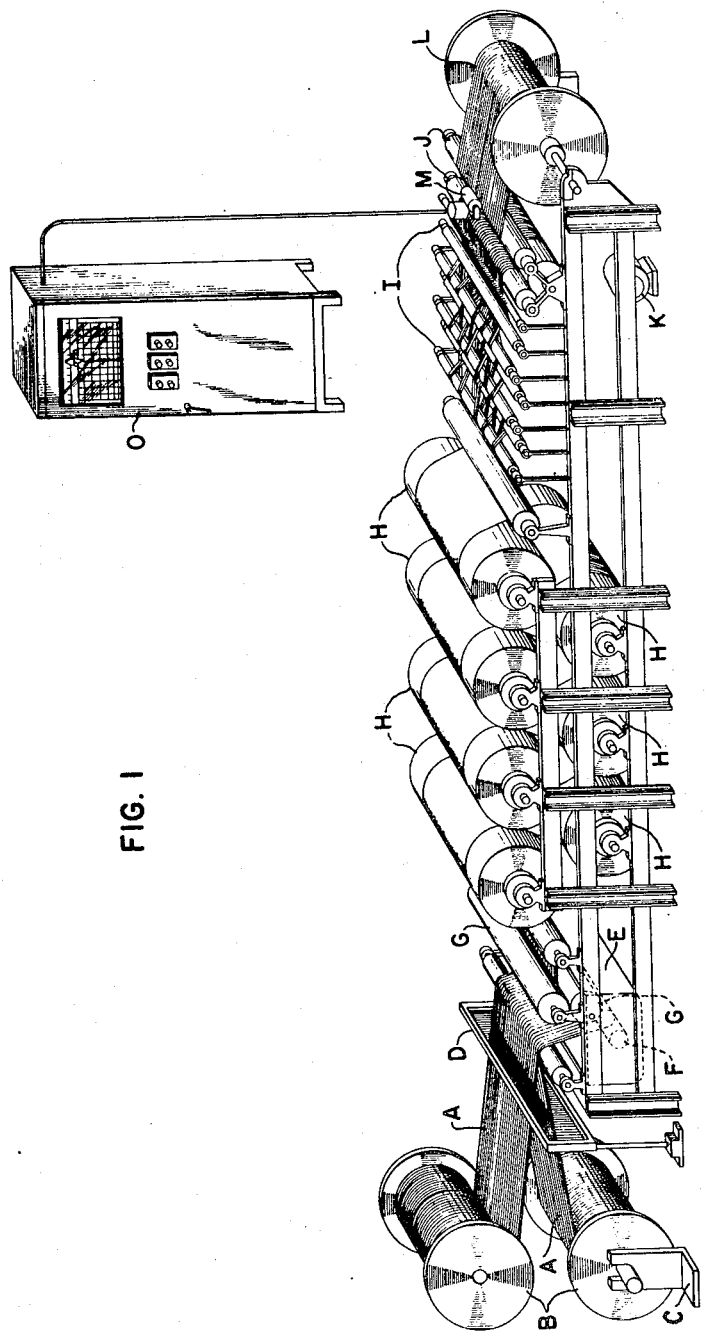
Fig. 1 is a diagrammatic representation of a warp sizing, or slasher, machine and associated means for measuring the moisture content of the yarn as it passes away from the slasher machine.

The high speed rayon slasher, shown diagrammatically by way of example in Fig. 1, is supplied with warp yarn A which is drawn from a plurality of section beams B mounted in a creel or beam supporting framework C. The yarn is drawn from the beams B through a reed D and thence into a sizing bath in a sizing pan E. Associated with the latter is a submerged guide roll F and a pair of squeeze rolls G above the sizing bath and between which the warp yarn passes from the bath. Excess size, squeezed out of the yarn by the squeeze rolls G, drops back into the sizing bath. From the squeeze rolls G the yarn passes successively over and under drying cylinders, or cans, H, the temperatures of which are regulated by regulating the temperature of the fluid therein. All of the cans H may be steam heated, in which case the temperature of the steam in each drum depends on the steam pressure in the drum. In some cases one or more of the cans adjacent the delivery end of the slasher may be supplied with a liquid coolant at a regulated temperature. From the final cylinder H of the series, the yarn passes over so-called split rods I to metallic draw rolls J.

The speed of rotation of the rolls J controls the speed with which the yarn is moved through the slasher. In ordinary practice, the speed of rotation of the draw rolls J is controlled by a variable speed drive unit K and may be varied to vary the moisture content, commonly called the "regain," in the yarn leaving the slasher. As will be understood, the moisture content of the yarn leaving the slasher tends to vary inversely with the time required for the movement of the yarn over the drying cylinders H. From the final draw roll J, the yarn passes to the loom beam L.

As the yarn passes over the final draw roll J, its moisture content is measured by measuring the electrical resistance of the yarn between said final draw roll and a metallic detector roll M held out of contact with the final draw roll J by the yarn. The detector roll M is gravitationally biased for movement toward the cooperating draw roll J so that the yarn is subjected to a suitably small and substantially constant contact pressure.

Figure 2:
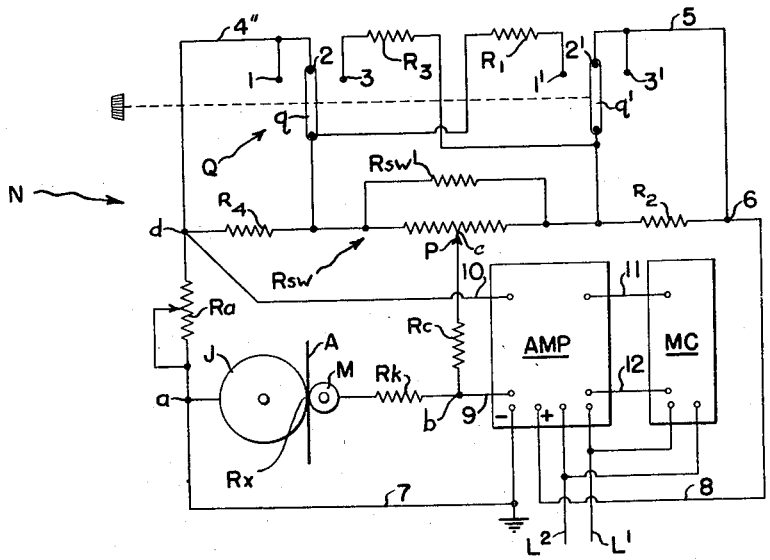
Fig. 2 is a diagram illustrating my improved electric circuit measuring apparatus.

The measurement of the electrical resistance of the yarn is effected by measuring and control apparatus including a Wheatstone bridge N which is illustrated diagrammatically in Fig. 2, and most of which is enclosed in an instrument housing O shown in Fig. 1. The detector roll M and the unknown resistance $Rx$ of the yarn between the two rolls are diagrammatically shown in Fig. 2 as included in one arm of the bridge N. That arm also includes a range resistor $Rk$ of relatively high resistance in series with the resistance $Rx$, and is connected at the bridge junction $a$ to the bridge arm including a ratio resistance $Ra$ which may be variable for calibration purposes but is not varied in the course of any measuring operation. At the bridge junction $b$ the arm including the resistance $Rx$ and resistor $Rk$ is connected to the third arm of the bridge which includes a second range resistor $Rc$. The last mentioned arm is connected at the bridge junction $c$ to the fourth bridge arm. The latter extends between the bridge junctions $c$ and $d$ and is connected at the last mentioned junction to the end of the second mentioned bridge arm remote from the junction $a$.

Said fourth bridge arm is the rebalancing arm of the bridge circuit and includes more or less of a slide wire resistance $Rsw$ depending on the position along that resistance of a slider contact P. That contact P is connected to the end of the resistance $Rc$ remote from the bridge junction $b$. The bridge junction $c$ is at the point of engagement of the slider contact P with the slide wire resistor $Rsw$. One terminal of the slide wire resistor $Rsw$ is permanently connected through the resistor $R4$ to the bridge junction $d$, but the resistor $R4$ is short-circuited at times, as hereinafter explained. One set of values of the resistance elements shown in Fig. 2, suitably related for the use of the apparatus illustrated in Fig. 1, are tabulated hereinafter. At this point it is noted that the resistances $Rk$ and $Rc$ are very much larger than the resistances $Ra$ and $Rsw$.

The rebalancing arm of the bridge may be described as comprising a variable portion of a circuit network which includes in addition to the slide wire resistor $Rsw$, fixed resistors $R_1$, $R_2$, $R_3$, and $R_4$ and a double pole three position range shifting switch Q. That switch Q comprises pivoted switch blades $q$ and $q'$ and contacts 1, 2, 3 and 1', 2' and 3'. The blades $q$ and $q'$ are mechanically connected for similar simultaneous turning movements about their respective pivot axes. The switch Q may be manually adjusted into three operative positions. In position 1, the blades $q$ and $q'$ respectively engage the contacts 1 and 1'. In position 2, the blades $q$ and $q'$ respectively engage the contacts 2 and 2', and in position 3, the blades $q$ and $q'$ respectively engage the contacts 3 and 3'.

As shown in Fig. 2, the switch blade $q$ is permanently connected to the left end, and the blade $q'$ is permanently connected to the right end, of the slide wire resistor $Rsw$. The contacts 1 and 2 are permanently connected by a conductor 4'' to the bridge junction $d$. When the switch blade $q$ is in the position in which it engages the contact 3, the resistor $R4$ is operatively included in the bridge circuit, but when the switch blade $q$ is in engagement with either of the contacts 1 and 2, the switch blade $q$ and conductor 4'' form a short-circuit about the resistor $R4$. As shown in Fig. 2, the resistor $R_2$ has one end permanently connected to the right end of the slide wire resistor $Rsw$, and has its second end connected at the point 6 to a conductor 5. The latter is connected to the switch contacts 2' and 3', and when the switch blade $q'$ engages contact 2' or contact 3', the said switch blade and the conductor 5 form a short circuit about the resistor $R_2$.

The resistor $R_3$ has one end connected to the connected ends of the resistors $R_2$ and $Rsw$, and has its second end connected to the switch contact 3. In consequence, when the switch blade $q$ engages the contact 3, the resistor $R_3$ is connected in shunt to the slide wire resistor $Rsw$ and thus reduces the effective slide wire resistance included in the bridge circuit in any position of the slider contact P. The resistance $R_1$ has one end permanently connected to the switch contact 1', and has its other end connected to the connected ends of the resistor $R4$ and slide wire resistance $Rsw$, so that when the switch blade $q'$ is in engagement with the contact 1', the resistor $R_1$ is connected in shunt to the slide wire resistance $Rsw$ and correspondingly reduces the amount of resistance in the rebalancing arm of the bridge in any position of the slider contact P. The slide wire resistor $Rsw$ may consist of a single length of a resistance wire, but conveniently and as shown, it comprises a length of resistance wire directly engaged by the slider contact P and comprises a second length of resistance wire $Rsw'$, connected in parallel with the first mentioned length of resistance wire. The two lengths of resistance wire are permanently connected and are collectively referred to herein as the slide wire resistor $Rsw$.

As shown, the junction points $a$ and $c$ constitute the input or energizing terminals of the bridge N. The junction point $a$ is connected by a conductor 7 to the negative terminal of a source of unidirectional bridge energizing voltage which, as shown in Fig. 3, is derived from the rectifier S. The positive terminal of the voltage source S is connected by a conductor 8 to the previously mentioned point 6. The conductor 8 is thus operatively connected to the end of the slide wire resistor $Rsw$ remote from the bridge junction point $d$ through the resistor $R_2$ when the switch blade $q'$ is in engagement with the contact 1', and through the conductor 5 and switch blade $q'$ when the latter is in engagement with either of the contacts 2' and 3'.

The bridge junctions $b$ and $d$ constitute the output terminals of the bridge N, and are at the same potential when the position of the slider contact P is such as to balance the bridge, and when the bridge is unbalanced the potential of the junction $b$ is positive or negative relative to the potential of the junction $d$, depending on the direction in which the slider contact P is displaced from the position along the slide wire resistor Rsw at which the bridge would then be in balance. The bridge output junctions $b$ and $d$ are connected by conductors 9 and 10 to a device AMP which includes the rectifier S and also includes an electronic amplifier for amplifying any potential difference existing between the junctions $b$ and $d$.

The amplified signal is transmited by the output conductors 11 and 12 of the device AMP to a measuring controller MC. The latter may well be a self-balancing recording potentiometer comprising relay mechanism including a connection for adjusting the slider contact P along the slide wire resistor Rsw as required to rebalance the bridge, when unbalanced, and thereby eliminate the difference between the potentials of the bridge junction points $b$ and $d$, which exists when the bridge is unbalanced. The relay mechanism of the measuring controller MC may well be of the known reversible motor type disclosed in the Wills Patent 2,215,805 of September 24, 1940, and may be operatively connected to and control the variable speed slasher drive mechanism K. The device AMP is energized by alternating current, which may be of ordinary commercial frequency and voltage, for example 60 cycles per second and 115 volts by means of conductors L' and L². The conductors L' and L² also supply energizing current to the measuring controller MC.

The rectifier S included in the amplifier and power supplying device AMP, is shown in Fig. 3 as of conventional full wave type comprising a duplex diode electronic tube T, and a transformer having a primary winding S' connected between the alternating current supply conductors L' and L², and having three secondary windings S², S³ and S⁴. The winding S² supplies heating current to the filamentary cathode of the tube T. One of the anodes of that tube is connected to one end of the secondary winding S³, and the other anode is connected to the second end of the winding S³. A conductor 13 is connected to the midpoint of the winding S³ and forms the negative terminal of the rectifier S and is connected to the bridge energizing conductor 7. The positive terminal 14 of the rectifier includes a choke coil 15 having its ends connected by parallel condensers 16 to the negative rectifier terminal 13. The choke coil 15 may have an inductance of 15 henries and condensers 16 may each be of 10 microfarad capacity and form a filter to smooth out the unidirectional output current flow in the circuit including the terminals 13 and 14. The terminal 14 is connected through a resistor R$b$ to the positive bridge energizing conductor 8 connected to the bridge junction $c$ as hereinbefore described.

The output conductors 13 and 14 of the rectifier S also supply anode current to the electronic amplifying valves 19 and 20. Those valves are matched triodes advantageously included in a single tube U which may well be a commercially available class B amplifier type 79 tube. The positive rectifier terminal 14 is connected to the anode of the valve 19 through a branch conductor 18 and a load resistor R$j$, and is also connected to the anode of the valve 20 through the conductor 18 and a load resistor RL and a rheostat R$m$. The common cathode of the two valves is connected to the bridge output terminal 10 and to the control grid of the valve 20 through a resistor R$d$. As seen in Fig. 2, the conductor 10 is connected to the negative terminal 13 of the rectifier S through the variable resistor R$a$, and the resistance of the resistor R$a$ may well be adjustable between 5000 and 7000 ohms. The control grid of the triode 19 is connected to the control grid of the valve 20 by a resistor R$s$ of relatively high resistance. The anode of the valve 19 is connected through the resistor R$f$ to the output terminal 11, and thereby to one terminal of the measuring controller MC. The anode of the valve 20 is connected through a resistor R$z$ to the output terminal 12 of the device AMP and thereby to the second terminal of the measuring controller MC.

The resistance values of the resistance elements shown in Figs. 2 and 3 may vary quite widely as a result of differences in the use and conditions of operation of the apparatus. In general, however, the values of the resistors included in the circuit network which includes the resistors R₁, R₂, R₃, R₄ and Rsw, and is associated with the rebalancing branch of the bridge circuit N, must be suitably related and proportioned for the different measuring ranges established when the switch blades $q$ and $q'$ are adjusted into their different positions. Values of the various resistance elements suitable for use in the practical operation of apparatus of the character shown, in measuring the resistance of sized rayon yarn leaving a slasher, as shown in Fig. 1, and having a resistance which may vary between 10 and 100,000 megohms, are as follows:

| Resistor | Unit | Value |
|---|---|---|
| Resistor R$a$ | ohms | 6150 |
| Resistor R$b$ | do | 2500 |
| Resistor R$c$ | megohms | 200 |
| Resistor R$d$ | ohms | 750 |
| Resistor R$f$ | do | 20,000 |
| Resistor R$g$ | do | 400 |
| Resistor R$j$ | do | 3000 |
| Resistor R$k$ | megohms | 1000 |
| Resistor RL | ohms | 1800 |
| Resistor R$z$ | do | 0–100 |
| Resistor R$s$ | megohms | 5 |
| Resistor Rsw | ohms | 1230 |
| Resistor R₁ | do | 1230 |
| Resistor R₂ | do | 615 |
| Resistor R₃ | do | 616.8 |
| Resistor R₄ | do | 819.2 |

Figs. 4, 5 and 6 are simplified circuits illustrating the effective form and condition of the bridge circuit N and the connection of the latter between the bridge junction $d$ and the energizing conductor 8, with the range shifting switch Q respectively in its No. 1 position, its No. 2 position and its No. 3 position. Figs. 4, 5 and 6 include by way of illustration, the particular numerical values of the different fixed resistors set forth by way of example in the foregoing table. In each of the Figs. 4, 5 and 6, R designates the value of the resistance in the rebalancing bridge arm between the junction $d$ and the slider contact P, which varies with the position of said contact.

In Fig. 4, the resistance R₁ is connected in parallel with the slide wire resistance Rsw, and the resistor R₂ operatively connects the slide wire resistor to the energizing conductor 8. The value of the resistance R included in the rebalancing arm thus varies between 615 ohms and zero as the contact P is moved from the right to the left end of its range of movement along the slide wire $R_{sw}$. It is to be noted, however, that in the condition of the apparatus shown in Fig. 4, the joint resistance of the parallel resistors $R_{sw}$ and $R_1$ is equal to the resistance of the resistor $R_2$ and the potential drop in the slide wire resistance $R_{sw}$ is only half of the total potential drop in the circuit branch including the resistors $R_{sw}$ and $R_2$ through which the bridge energizing conductor 8 is connected to the bridge junction $d$.

In Fig. 4 the resistor $R_2$ serves as a positive range suppressing resistance and makes the apparatus incapable of measuring the values of the resistance $R_x$ which can be measured in the lower half of the measuring scale of the apparatus when the resistor $R_{sw}$ forms the entire connection between the bridge junction $d$ and the energizing conductor 8, as it does in Fig. 5.

Fig. 6 shows the condition of the apparatus with the range shifting switch Q in its No. 3 position in which the resistance $R_3$ is connected in parallel with the slide wire resistance $R_{sw}$, and in which the right hand end of the slide wire resistance is connected directly to the energizing conductor 8, while its left hand end is connected to the bridge junction point $d$ through the resistor $R_4$. With the assumed values of the resistors $R_3$ and $R_4$, the resistance R in the rebalancing arm of Fig. 6 will vary from a maximum of 1230 ohms to a minimum of 819.2 ohms as the contact P is moved along the slide wire resistance $R_{sw}$ from the right hand to the left hand end of the latter. The effect of the interposition of the resistance $R_4$ between the bridge junction point $d$ and the slide wire resistance $R_{sw}$, as shown in Fig. 6, is to make the change in the potential drop in the rebalancing arm produced by the adjustment of the contact P from the right end to the left end of the resistor $R_{sw}$, approximately one-third of what it would be if the resistor $R_4$ were short-circuited.

In the Fig. 6 condition of the apparatus, the resistor $R_4$ thus acts as a negative range suppressor and makes the apparatus incapable of measuring the values of the resistance $R_x$ which can be measured in the upper two-thirds of the measuring scale of the apparatus shown in Fig. 2 when in the condition shown in Fig. 5.

The terms "positive" and "negative" as used herein to characterize the range suppressing actions of the resistor $R_2$ in Fig. 4, and of the resistor $R_4$ in Fig. 6, are selected arbitrarily to distinguish between and identify the suppression of low and high end portions, respectively, of the total range of variation of the resistance $R_x$ which is measurable by the apparatus when in the condition shown in Fig. 5.

When the range shifting switch Q is in its No. 2 position, the apparatus is adjusted into its condition shown in Fig. 5, in which the resistance $R_{sw}$ has its right end directly connected to the energizing conductor 8 and has its left end directly connected to the bridge junction $d$. With the Fig. 5 arrangement, the full potential drop between the junction $d$ and energizing conductor 8 occurs in the slide wire resistance $R_{sw}$. In consequence, the amount of resistance included in the rebalancing arm at any instant is dependent on the position of the slider contact P, and varies between 1230 ohms and zero ohms as the slider contact P is moved from the right end to the left end of the resistance $R_{sw}$. The measuring apparatus in the condition shown in Fig. 2 has no range suppressing action and is theoretically capable of measuring any value of the resistance $R_x$ between zero and infinity.

Figure 8:
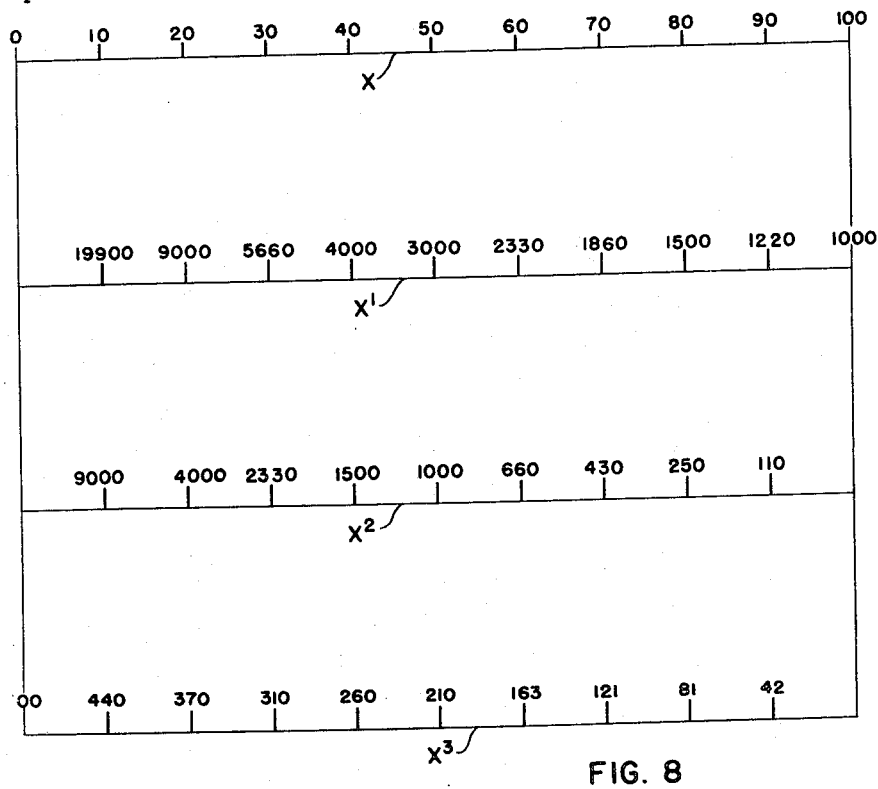
Fig. 8 is a diagram illustrating various gradations of a measuring or chart scale which may be used in making measurements in different scale ranges.
Figure 7:
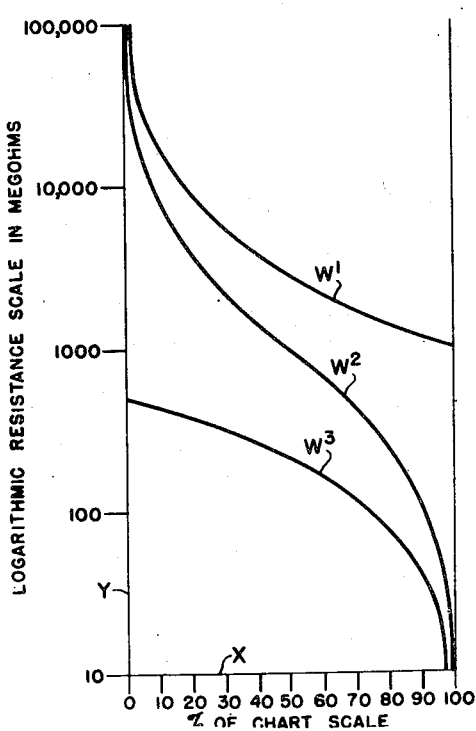
Fig. 7 is a diagram including curves showing measurements which may be made with the apparatus shown in Fig. 2 when adjusted in the different ways illustrated in Figs. 4, 5 and 6.

With the resistance values hereinbefore given by way of example, the apparatus shown in Fig. 2 is practically usable to measure values of the resistance $R_x$, varying from a minimum value of 10 megohms to a maximum value of 100,000 megohms in the manner illustrated in Fig. 7. The horizontal scale X of Fig. 7 represents the total measuring scale, or chart range, of the recording potentiometer or other measuring instrument MC, as the contact P is moved from one end to the other of the resistor $R_{sw}$. The scale X may be marked in various units as conditions make desirable, as is illustrated in Fig. 8. As shown in Fig. 7, the markings 0, 10, 20, etc. applied to the scale X indicate that the length of the scale is divided into 100 equal units. Other scale markings are shown in Fig. 8, as is hereinafter explained. In Fig. 7, the vertical scale Y is a logarithmic scale of the range of values of the unknown resistance $R_x$ which the apparatus is adapted to measure. In accordance with the assumptions made, the scale Y indicates resistance values varying from a minimum of 10 megohms at its lower end, to a maximum of 100,000 megohms at its upper end. The scale Y is given its logarithmic character to avoid the crowding of the lower values of the resistance $R_x$ in the lower portion of the chart shown in Fig. 7 which would exist if the scale Y were of a linear character. It will be noted, however, that the replacement of the vertical logarithmic resistance scale by a vertical linear scale without change in the linear horizontal scale X would not change the position of any point on the curves $W'$, $W^2$ and $W^3$ in the horizontal direction. Thus the resistance reading made by projecting any curve point on to the scale line X, would be the same with the linear and logarithmic resistance scales.

In Fig. 7, the curve $W^2$ represents the range of values of the resistance $R_x$ measurable with the apparatus in the condition shown in Fig. 5 in which there is no range suppression. On the assumption hereinbefore made, points along the curve $W^2$ thus correspond to values of the resistance $R_x$ varying from a minimum of 10 megohms to a maximum of 100,000 megohms.

The curve $W'$ represents the range of values of the resistance $R_x$ which can be measured with the apparatus when adjusted into its Fig. 4 condition in which there is a 50 percent positive range suppression. As is apparent from inspection of Fig. 7, the entire range of values shown by the curve $W'$ is shown by the left half of the curve $W^2$. It should be noted that when curve $W'$ is extended to a limiting value of 1% of the chart scale X the upper limit of resistance $R_x$ which may be measured approximates 200,000 megohms. Measurements of resistance values of $R_x$ of this upper limit may readily be accomplished with the apparatus adjusted into its Fig. 4 condition.

The curve $W^3$ represents the range of values of the resistance $R_x$ measurable by the apparatus in the condition shown in Fig. 6 in which there is a 66⅔ percent negative range suppression, and the entire range of values shown by the curve $W^3$ is shown by the portion of the curve $W^2$ above the right third of the scale X. With the curve $W^3$ extended to a limiting value of 99% of the chart scale X, the lower limit of resistance $R_x$ which may be measured with the apparatus adjusted to its Fig. 6 condition will approximate 2 megohms.

The range of resistance variation to which the curve $W^2$ corresponds, may be termed the basic resistance range practically measurable with the apparatus shown in Fig. 2 and having the various resistor values hereinbefore assumed by way of example. As previously indicated, the measuring apparatus in its condition shown in Fig. 5, is theoretically capable of measuring all values of the resistance $Rx$ between zero and infinity. The ends of the curve $W^2$ approach vertical asymptotes, and this explains why it is practically impossible to measure resistance values which are unduly small or unduly large. The ends of the curve $W^2$ will approach parallel asymptotes regardless of the values selected for the fundamental bridge resistors $Ra$, $Rk$, $Rc$, and $Rsw$. In consequence, the horizontal displacement in Fig. 7 of any points in the end portions of the curve $W^2$, which are spaced apart by short distances longitudinally of the curve and represent resistance values below 10 megohms or above 100,000 megohms, is, in practice, not capable of precise measurement. Under ordinary conditions, it is not practically feasible to measure accurately with the apparatus in its Fig. 5 condition any resistance value below the values corresponding to less than about one percent, or to more than about 99 percent of the chart scale X.

As will be apparent, with the apparatus in the condition shown in Fig. 5 and with the resistance $Rx$ equal to zero, the resistance values of the resistors $Ra$, $Rk$ and $Rc$ are necessarily related, as shown in the following equation:

$$\frac{Ra}{Rk} = \frac{Rsw}{Rc} \quad (A)$$

As previously pointed out, for the intended use of the apparatus in measuring a resistance which may vary between 10 and 100,000 megohms, the selected resistance values of the resistors $Rk$ and $Rc$, are 1000 and 200 megohms, respectively. The precise resistance values of the resistors $Rk$, $Rc$, $Ra$ and $Rsw$ are not critical and theoretically those values are capable of variations within limits, subject to the maintenance of the relationship of the values expressed in the foregoing Equation A. The stated values for said fundamental resistors were selected as practically desirable because they give about as good measuring results as are obtainable for the contemplated resistance range to be covered, and because they permit the use of the high resistance, composition type range resistors $Rk$ and $Rc$ of a character suitable from the practical standpoints of bulk or space limitations, inherent production cost and resistor stability and uniformity in respect to voltage and temperature coefficients, humidity characteristics and resistivity permanence.

With the 5 to 1 ratio of the resistance values of the resistors $Rk$ and $Rc$, the resistance value of the resistance $Ra$ must necessarily be 5 times the resistance value of the slide wire resistance $Rsw$. The value of the resistance $Rsw$ of 1230 ohms was selected on the assumption that it would give about as good measuring sensitivity in practice with the range switch Q in its different positions as is practically obtainable. The selection of the resistance value of 1230 ohms for the resistor $Rsw$ requires the resistance $Ra$ to have a value of 6150 ohms. The selection of the resistance values of the resistors $Ra$ and $Rsw$, fixes the values of the resistors $R_1$, $R_2$, $R_3$ and $R_4$ which can be used to obtain the particular positive and negative range suppressions of 50 and 66⅔ percent, respectively, while at the same time maintaining a uniform resistance of 1230 ohms between the bridge junction $d$ and the energizing conductor 8, as is obviously desirable from the practical standpoint.

The positive resistance range suppression can be increased or decreased by increasing or decreasing the resistance value of the resistor $R_2$. Similarly, an increase or decrease in the resistance value of the resistor $R_4$ will respectively increase or decrease the negative range suppression effect of the resistor. Any change in the resistance of either of the suppressor resistors $R_2$ and $R_4$ requires a compensating change in the resistance of the resistor $R_1$ or $R_3$. The effect on the resistance range suppressing action of either resistor $R_2$ or $R_4$ of any particular change in the resistive value of the resistor, can be determined by simple arithmetic when the selected values of the fundamental resistors $Ra$, $Rk$, $Rc$ or $Rsw$ are known, as will be apparent to those skilled in the art. Similarly, the compensating changes to be made in the resistances of the resistor $R_1$ or $R_3$ on a change in the resistance of the resistor $R_2$ or $R_4$, respectively, can be determined by simple arithmetic.

As Fig. 7 makes plainly apparent, the values of the resistance $Rx$ shown in common by the curves $W'$ and $W^2$, are shown on a more open scale, and may be read more easily and more accurately, on the curve $W'$ than on the curve $W^2$. Similarly, the values shown in common by the curves $W^2$ and $W^3$, can be read more easily and more accurately on the curve $W^3$ than on the curve $W^2$.

The differences between the scale values of points on the different curves $W'$, $W^2$ and $W^3$ are shown by the scale values marked at points along the horizontal lines X, X', $X^2$ and $X^3$ of Fig. 8. Each of those lines corresponds to the scale line X of Fig. 7. The line X of Fig. 8 is gradated in the same linear units as in Fig. 7. The line X' is gradated to show the values of the resistance $Rx$ in megohms at the points on the curve $W'$ vertically above the respective points on the scale line X' which correspond in position to the marked points 10, 20, etc. on the scale line X of Figs. 7 and 8.

The scales $X^2$ and $X^3$ are gradated in a similar manner to show the numerical values on those scales of values of the resistance $Rx$ shown by the curves $W^2$ and $W^3$, respectively. The numerical values appearing on the scales X', $X^2$ and $X^3$ were approximated from the curves $W'$, $W^2$ and $W^3$, respectively. They can be accurately computed by simple arithmetic from the known values of the resistors $Ra$, $Rk$, $Rc$, $Rsw$, $R_1$ $R_2$ $R_3$ and $R_4$.

In considering the curves $W'$, $W^2$ and $W^3$, of Fig. 7 and the scales X', $X^2$, and $X^3$ of Fig. 8, it should be borne in mind that in each of said curves the value of the resistance $Rx$ can be determined by the following Equation B:

$$\frac{Ra}{Rx+Rk} = \frac{R}{Rc} \quad (B)$$

and can be directly expressed in the following Equation C:

$$RX = \frac{RaCa}{R} - Rk \quad (C)$$

The resistance R, while variable, can be determined for every measurement by inspection of Figs. 4, 5 and 6 showing the arrangement used in making the measurement, when account is taken of the position along the resistance $Rsw$ into which the slider contact P is adjusted in making the measurement. In measuring the value of the resistance represented by any point on any of the curves $W'$, $W^2$ and $W^3$, the bridge balancing position of the slider contact P along the resistor $Rsw$ is displaced from the left end of the latter by a distance proportional to the horizontal displacement of said curve point from the scale line Y of Fig. 7.

The horizontal displacement of any point on the curve $W'$ or $W^3$ from the point on the curve $W^2$ representing the same resistance value, results from the fact that the movement of the slider contact P results in a change in the potential of said contact which is half as great in the Fig. 4 condition of the apparatus as it is in the Fig. 5 condition, and which in the Fig. 6 condition is one-third of what it is in the Fig. 5 condition of the apparatus.

Figure 2A:
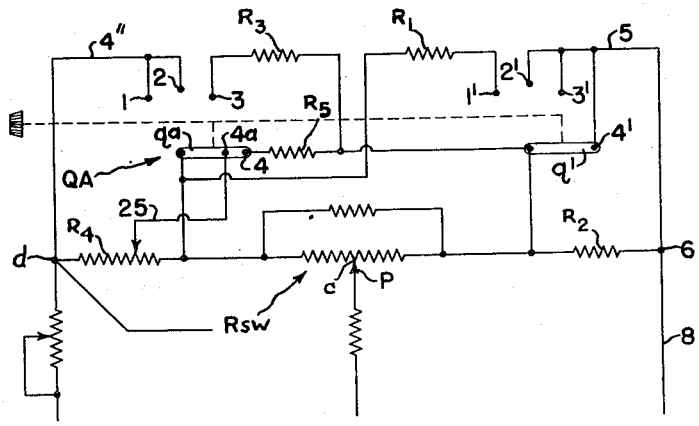
Fig. 2A is a diagram showing a modification of the arrangement of Fig. 2.

As the foregoing explanations make apparent, it is possible by suitable changes in the range shifting switch mechanism, and in the number and relative values of the resistors included in the circuit network including the resistor $Rsw$ and associated with the rebalancing arm of the bridge N, to adapt the measuring apparatus for use with only one resistance range suppression or with more than two resistance range suppressions. By way of illustration and example, I have shown in Fig. 2A a modification of the apparatus shown in Fig. 2, providing for a negative suppression range of fifty percent in addition to the ranges provided for in Fig. 2. In Fig. 2A the range shifting switch QA has a fourth position in addition to the three positions of Fig. 2. In the fourth position of the switch QA the switch blade $qa$, replacing the blade $q$ of Fig. 2, engages a contact 4 and a contact 4a. When the blade $qa$ engages the contact 4, it thereby connects a resistor $R_5$ in parallel with the resistor $Rsw$. When the blade $qa$ engages the contact 4a it thereby short-circuits the portion of the resistance $R_4$ at the right of the point along that resistance which is connected to the switch contact 4a by the conductor 25. When in its fourth position, the switch blade $q'$ of Fig. 2A engages a contact 4' which is connected to the conductor 5. To obtain the fifty percent negative suppression, the resistor $R_5$ requires a value of 1230 ohms, and the portion of the resistance $R_4$ not short-circuited by the connections of the conductor 25 to the switch blade $qa$, needs to have a value of 615 ohms.

The use of one positive and one negative resistance range suppression effect of the general character illustrated in Fig. 7, has been found to be practically desirable in the use of the apparatus disclosed in measuring the resistance and controlling the moisture content of rayon yarn. It is possible to simplify the apparatus shown by decreasing the negative range suppression from 66⅔ percent to 50 percent, or less. In such case, any value of the resistance $Rx$ which can be measured with the apparatus in the condition shown in Figs. 4, 5 and 6 could be made without adjusting the apparatus into its basic range condition, shown in Fig. 5. However, the capacity of the apparatus for adjustment into its Fig. 5 condition has practical advantages. For one thing, it permits the range suppression effects to be greater than would be possible if some intermediate values of the resistance $Rx$ could not be measured by an intermediate portion of the curve $W^2$, as values of the resistance $Rx$ between 500 and 1000 megohms are measured with the apparatus in its Fig. 5 condition. Furthermore, confusion which might otherwise exist in some cases, as to whether the range shifting switch Q should be in its No. 1 or in its No. 3 position, can be avoided by adjusting the switch into its No. 2 position and observing the measurement then made on the chart scale X. That measurement will show instantly whether the switch should be adjusted into its No. 1 or No. 3 condition, or left in its No. 2 condition.

The effect of connecting either of the resistors $R_1$ and $R_3$ in parallel with the resistor $Rsw$ is to reduce the measurement sensitivity. This is an inevitable result of the fact that the connection of either of the resistors $R_1$ and $R_3$ in parallel with the resistor $Rsw$ must reduce the current flow through the resistor $Rsw$, if the desired constant potential difference between the junction $d$ and energizing conductor 8 is maintained as is desirable. The reduction of the current flow through the resistor $Rsw$ reduces the potential difference between the ends of that resistor and thus reduces the change in the potential of the slider contact P produced by a given movement of the contact along said resistor. The reduction in sensitivity produced by connecting either of the resistors $R_1$ and $R_3$ in parallel with the resistor $Rsw$ does not significantly affect the accuracy of the measurements, but may increase the time required to move the slider contact P into its rebalancing position when the bridge is unbalanced.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A multi-range measuring apparatus including first and second energizing terminals for connection to a source of energizing voltage and a resistance bridge circuit connected between and energized through said terminals and comprising a first arm including in series a variable resistance to be measured and a first range resistor, a second arm connected at one end to one end of said first arm and including a ratio resistor, one of said terminals being connected to the connected ends of said first range and ratio resistors, a third arm having one end connected to the second end of the first arm and including a second range resistor, a slider contact connected to the second end of the third arm, and a circuit network connected between said second terminal and the second end of said second arm and including a slide wire resistor engaged by said slider contact, first, second, third and fourth resistors, conductors without significant resistance and a switch mechanism selectively adjustable into at least two different operative adjustment conditions, said circuit network comprising portions in each adjustment condition connecting said slider contact and second arm and constituting the fourth arm of said bridge circuit, said circuit network resistors, conductors and switch mechanism being so relatively arranged in one adjustment condition of said switch mechanism that said slide wire resistor has one end operatively connected to said second arm through a conductor and has its second end operatively connected to said second terminal through said second resistor and is connected in parallel with said first resistor, and being so arranged that in an another adjustment condition of said switch mechanism said slide wire resistor has one end connected to said second arm through said fourth resistor and has its second end connected to said second terminal through a conductor and is connected in parallel with said third resistor, said network resistors having such relative resistance values that the resistance between said second terminal and second arm is constant in each of the adjustment conditions of said switch mechanism, and said ratio, range and network resistors having such relative resistance values that the ratio of said ratio resistor resistance to the first range resistor resistance is equal to the ratio of the slide wire resistor resistance to the resistance of the second range resistor, and that when the adjustment of the slider contact along the slide wire resistor is that required to balance the bridge circuit by making the potential of the junctions of the first and third bridge arms equal to the potential of the junction of the second and fourth arms, the resistance to be measured is equal to the amount by which the product of the ratio and second range resistors divided by the resistance of the fourth bridge arm exceeds the resistance of the first range resistor, whereby relatively large and relatively small values of the resistance to be measured are respectively indicated on first and second predetermined scales by the position of the slider contact along the slide wire resistor when the bridge circuit is balanced.

2. Apparatus as specified in claim 1, in which the resistance of said second range resistor is larger than the resistance of said ratio resistor and is smaller than the resistance of said first range resistor, and in which the minimum and maximum values of resistance to be measured are respectively smaller and larger than the resistance of the first range resistor.

3. Apparatus as specified in claim 1, in which said switch mechanism has an adjustment condition in which said slide wire resistor has one end connected through a conductor to said second arm and has its second end connected through a conductor to said second terminal and constitutes the only significant resistance in the connection between said second arm and said second terminal.

4. Apparatus as specified in claim 1, in which said circuit network includes a fifth resistor and includes a conductor connected to said fourth resistor at an intermediate point along its length, and in which said switch mechanism has an adjustment condition in which said slide wire resistor has one end connected to said second arm through said fourth resistor and has its second end connected to said second terminal through a conductor, and in which said fifth resistor and the said conductor connected to said fourth resistor are connected in series with one another between said intermediate point of said fourth resistor and the second end of said slide wire resistor, and in which the said conductor, said switch mechanism and another conductor form a short circuiting shunt about the portion of said fourth resistor between its said intermediate point and said slide wire resistor.

LEE E. CUCKLER.

REFERENCES CITED

The following references are of record in the file of this patent:

UNITED STATES PATENTS

| Number | Name | Date |
|---|---|---|
| 1,665,397 | Wunsch | Apr. 10, 1928 |
| 1,960,350 | Shackleton et al. | May 29, 1934 |
| 1,961,965 | Fisher | June 5, 1934 |
| 2,135,587 | Lovelady | Nov. 8, 1938 |
| 2,162,894 | Logan | June 20, 1939 |

FOREIGN PATENTS

| Number | Country | Date |
|---|---|---|
| 486,130 | Great Britain | Dec. 30, 1937 |